US011057506B2

(12) United States Patent
Zeng

(10) Patent No.: US 11,057,506 B2
(45) Date of Patent: *Jul. 6, 2021

(54) CAMERA ASSEMBLY AND ELECTRONIC APPARATUS

(71) Applicant: GUANGDONG OPPO MOBILE TELECOMMUNICATIONS CORP., LTD., Guangdong (CN)

(72) Inventor: Zanjian Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,636

(22) Filed: Apr. 16, 2020

(65) Prior Publication Data

US 2020/0288003 A1 Sep. 10, 2020

Related U.S. Application Data

(63) Continuation of application No. PCT/CN2018/117855, filed on Nov. 28, 2018.

(30) Foreign Application Priority Data

Nov. 30, 2017 (CN) .......................... 201711245763.2

(51) Int. Cl.
*H04N 5/225* (2006.01)
*H04M 1/02* (2006.01)
(Continued)

(52) U.S. Cl.
CPC ....... *H04M 1/0264* (2013.01); *H04M 1/0266* (2013.01); *H04M 1/18* (2013.01);
(Continued)

(58) Field of Classification Search
None
See application file for complete search history.

(56) References Cited

U.S. PATENT DOCUMENTS 7,568,848 B2 * 8/2009 Ho ...................... G03B 17/02
359/507
7,782,375 B2 * 8/2010 Chambers ............ H04N 5/2251
348/239
(Continued)

FOREIGN PATENT DOCUMENTS

CC 105554200 A 5/2016
CN 1550813 A 12/2004
(Continued)

OTHER PUBLICATIONS

International search report,PCT/CN2018/117855, dated Feb. 27, 2019 (3 pages).
(Continued)

*Primary Examiner* — Tuan A Tran

(57) ABSTRACT

The present disclosure provides a camera assembly and a mobile terminal. The camera assembly comprises a fixing frame, a support device, a guiding device, a camera module and a second magnetic structure. The support device has a first magnetic structure. The guiding device is connected to the fixing frame and the support device, respectively. The support device is slidably connected to the fixing frame by means of the guiding device. The camera module is arranged on the support device. The second magnetic structure is used for generating a magnetic field, and the second magnetic structure interacts with the first magnetic structure to apply a force to the support device in the sliding direction of the support device for sliding the support device. The support device slides under the guidance of the guiding device.

20 Claims, 8 Drawing Sheets

(51) Int. Cl.
  *H04B 1/38* (2015.01)
  *H04M 1/18* (2006.01)
(52) U.S. Cl.
  CPC ......... *H04N 5/2252* (2013.01); *H04N 5/2253* (2013.01); *H04N 5/2257* (2013.01)

(56) References Cited

U.S. PATENT DOCUMENTS

| | | | |
|---|---|---|---|
| 7,907,840 B2* | 3/2011 | Schack | G03B 29/00 |
| | | | 396/177 |
| 8,010,154 B2* | 8/2011 | Chambers | H04M 1/0264 |
| | | | 455/556.1 |
| 8,023,040 B2* | 9/2011 | Zhou | H04N 5/2252 |
| | | | 348/376 |
| 9,025,947 B1 | 5/2015 | Teng | |
| 9,535,310 B2* | 1/2017 | Gonzalez Sanchez | |
| | | | G06F 1/1656 |
| 9,654,675 B2* | 5/2017 | Kessler | G03B 17/17 |
| 9,692,953 B2* | 6/2017 | Xiong | G03B 11/043 |
| 9,736,383 B2* | 8/2017 | Evans, V | H04M 1/0264 |
| 9,762,781 B2* | 9/2017 | Evans, V | H04N 5/2254 |
| 9,834,154 B2 | 12/2017 | Carson | |
| 9,998,642 B2* | 6/2018 | Evans, V | H04N 5/2254 |
| 10,021,296 B2 | 7/2018 | Fan et al. | |
| 10,070,030 B2* | 9/2018 | Evans, V | H04M 1/72409 |
| 10,389,927 B2* | 8/2019 | Zhang | G03B 29/00 |
| 10,444,802 B2* | 10/2019 | Zeng | H04M 1/0237 |
| 10,516,773 B2* | 12/2019 | Yoon | H04N 5/23258 |
| 10,887,436 B2* | 1/2021 | Zeng | H04M 1/0264 |
| 2005/0014527 A1 | 1/2005 | Chambers et al. | |
| 2006/0033832 A1 | 2/2006 | Shin | |
| 2007/0279847 A1 | 12/2007 | Li et al. | |
| 2009/0082074 A1 | 3/2009 | Chen | |
| 2010/0124955 A1 | 5/2010 | Lin | |
| 2014/0218587 A1 | 8/2014 | Shah | |
| 2015/0009349 A1 | 1/2015 | Kim | |
| 2015/0189175 A1 | 7/2015 | Fan et al. | |
| 2016/0191760 A1 | 6/2016 | Wu | |
| 2017/0064054 A1 | 3/2017 | Lombardi et al. | |
| 2017/0126979 A1 | 5/2017 | Evans, V et al. | |
| 2017/0251131 A1 | 8/2017 | Wu et al. | |

FOREIGN PATENT DOCUMENTS

| | | |
|---|---|---|
| CN | 2745106 Y | 12/2005 |
| CN | 2762162 Y | 3/2006 |
| CN | 2837594 Y | 11/2006 |
| CN | 201066423 Y | 5/2008 |
| CN | 101236353 A | 8/2008 |
| CN | 101355756 B | 10/2012 |
| CN | 203206372 U | 9/2013 |
| CN | 103533222 A | 1/2014 |
| CN | 203858825 U | 10/2014 |
| CN | 104378132 A | 2/2015 |
| CN | 104618542 A | 5/2015 |
| CN | 204408431 U | 6/2015 |
| CN | 105049686 A | 11/2015 |
| CN | 105187700 A | 12/2015 |
| CN | 105208149 A | 12/2015 |
| CN | 205029708 U | 2/2016 |
| CN | 105430246 A | 3/2016 |
| CN | 105453526 B | 3/2016 |
| CN | 105554196 A | 5/2016 |
| CN | 205510137 U | 8/2016 |
| CN | 205725913 U | 11/2016 |
| CN | 103546687 B | 4/2017 |
| CN | 106603776 A | 4/2017 |
| CN | 206077465 U | 4/2017 |
| CN | 106657744 A | 5/2017 |
| CN | 106686291 A | 5/2017 |
| CN | 106850896 A | 6/2017 |
| CN | 106856516 A | 6/2017 |
| CN | 106911883 A | 6/2017 |
| CN | 206251153 U | 6/2017 |
| CN | 206338556 U | 7/2017 |
| CN | 107071242 A | 8/2017 |
| CN | 206413083 U | 8/2017 |
| CN | 206422833 U | 8/2017 |
| CN | 206433032 U | 8/2017 |
| CN | 107198133 A | 9/2017 |
| CN | 207118136 U | 3/2018 |
| CN | 207354463 U | 5/2018 |
| EP | 3373562 A1 | 9/2018 |
| EP | 3481035 A1 | 5/2019 |
| JP | 2003188968 A | 7/2003 |
| KR | 20060096681 A | 9/2006 |
| KR | 100879872 B1 | 1/2009 |
| TW | 201435467 A | 9/2014 |
| WO | 2014161401 A1 | 10/2014 |
| WO | 2015148061 A1 | 10/2015 |

OTHER PUBLICATIONS

English translation of Chinese First Office Action and Written Opinion for related Chinese application No 201711245763.2, dated May 21, 2020 (27 pages).
European Search Report and Written Opinion for related European application No. 18883905.4, dated Jun. 17, 2020 (8 pages).
Chinese Second Office Action with English Translation for Chinese application No. 201711245763.2, dated Nov. 13, 2020 (24 pages).
International Search Report for PCT/CN2018/110854 dated Dec. 29, 2018 (9 pages).
European Search Report for EP application No. 18197532.7 dated Jan. 7, 2019 (22 pages).
European examination report for EP application No. 18197532.7 ated Mar. 6, 2020 (7 pages).
Chinese First Office Action with English Translation for CN application No. 201711246192.4 dated May 21, 2020 (29 pages).
Indian First Examination Report for IN application No. 201814042611, dated Jul. 15, 2020 (6 pages).
Chinese Second Office Action with English Translation for Chinese application No. 201711246192.4 dated Oct. 20, 2020 (29 pages).
International Search Report for PCT/CN2018/102973 dated Aug. 29, 2018 (4 pages).
European Search Report for EP application No. 18190352.7 dated Dec. 3, 2018 (17 pages).
European Search Report for EP application No. 17202810.7 dated Mar. 15, 2018 (9 pages).
International Search Report with English Translation for PCT/CN2017/111807 dated Jan. 26, 2018 (12 pages).
Taiwan First Office Action with English Translation for TW Application 106146576, dated Sep. 12, 2018 (12 pages).
Chinese First Office Action with English Translation for Chinese application No. 201710132546.6 dated Jan. 28, 2019 (23 pages).
Chinese Second Office Action with English Translation for Chinese application No. 201710132546.6 dated Apr. 11, 2019 (25 pages).
Non Final Rejection for U.S. Appl. No. 15/824,490, dated Sep. 26, 2018 (12 pages).
Final Rejection for U.S. Appl. No. 15/824,490, dated Feb. 8, 2019 (14 pages).
China Notice of grant of patent right for Invention with English Translation for CN application No. 201711245763.2 dated Mar. 16, 2021 (4 pages).

* cited by examiner

CAMERA ASSEMBLY AND ELECTRONIC APPARATUS

CROSS-REFERENCE TO RELATED APPLICATION(S)

The present application is a continuation application of International Patent Application No. PCT/CN2018/117855, filed on Nov. 28, 2018, which claims priority to Chinese Patent Application No. 201711245763.2, filed on Nov. 30, 2017, the entire contents of both of which are hereby incorporated by reference in their entireties.

TECHNICAL FIELD

The present disclosure relates to display technique, and in particular to a camera assembly and an electronic apparatus.

BACKGROUND

Mobile terminals such as smart phones, tablet PCs, laptop PCs and PDA are capable of offering images or video to users via the display screen. The functions of mobile terminals are becoming more and more abundant, such as video recording, video chatting, photographing and so on. With the development of intelligent communication technology, it has become a new issue to provide large screen to display various functions of mobile terminals.

SUMMARY

The present disclosure may provide a camera assembly. The camera assembly may include a fixed holder, a support device comprising a first magnetic structure, a guiding device connected to the fixed holder and the support device, a camera module arranged on the support device, and a second magnetic structure configured to generate a magnetic field. The support device is slidably connected to the fixed holder by the guiding device; the second magnetic structure interacts with the first magnetic structure to apply a force to drive the support device to slide in a sliding direction of the support device relative to the fixed holder under the guidance of the guiding device, and the camera module is driven to move out of or in the fixed holder.

The present disclosure may provide an electronic apparatus. The electronic apparatus may include a display assembly configured to display information, a housing assembly, and a camera assembly arranged in the housing assembly. The display assembly is mounted on the housing assembly. At least a part of the camera assembly is stacked with a display area of the display assembly in a non-extended state. The camera assembly may include a support device including a first magnetic structure, a guiding device, a camera module and a second magnetic structure, the support device is slidably connected to the housing assembly through the guiding device; the camera module is arranged on the support device; the second magnetic structure interacts with the first magnetic structure to apply a force to drive the support device to slide under the guidance of the guiding device, and the camera module is driven to extend out of or retract in the housing assembly.

The present disclosure may provide an electronic apparatus. The electronic apparatus may include a processor and a camera assembly connected to the processor. The camera assembly may include a fixed holder, a support device including a first magnetic structure, a guiding device, a camera module and a second magnetic structure. The camera module is arranged on the support device; the support device is slidably connected to the fixed holder by the guiding device; the processor is configured to receive a control instruction to control the second magnetic structure to generate a repulsive force or a attractive force between the first magnetic structure and the second magnetic structure to drive the support device to slide under the guidance of the guiding device relative to the fixed holder, such that camera module is driven to move between an extended state and a non-extended state.

BRIEF DESCRIPTION OF DRAWINGS

In order to describe the technical solutions in the embodiments of the present disclosure more clearly, the drawings illustrative of the embodiments will be briefly described below. Obviously, the drawings in the following description only represent some embodiments of the present disclosure. For those of ordinary skill in the art, other drawings may also be obtained based on these drawings without any creativity.

DETAILED DESCRIPTION

Figure 1:
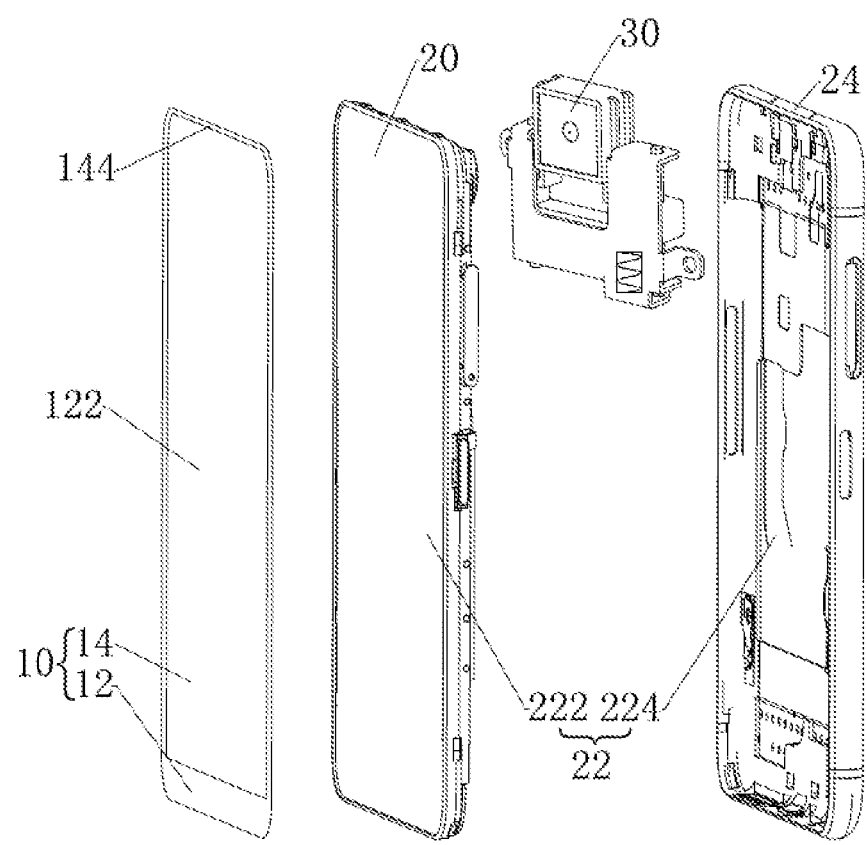
FIG. 1 is an exploded schematic view of a mobile terminal according to an embodiment of the present disclosure.

The technical solutions in the embodiments of the present disclosure will now be described clearly and completely in connection with the accompanying drawings. It is to be understood that the specific embodiments described herein are only used to interpret, rather than limit, the present disclosure. It should also be noted that for ease of description, only some but not all of the structures related to the present disclosure are shown in the drawings.

An aspect of the present disclosure may provide a camera assembly. The camera assembly may include a fixed holder, a support device comprising a first magnetic structure, a guiding device connected to the fixed holder and the support device, a camera module arranged on the support device, and a second magnetic structure configured to generate a magnetic field. The support device is slidably connected to the fixed holder by the guiding device; the second magnetic structure interacts with the first magnetic structure to apply a force to drive the support device to slide in a sliding direction of the support device under the guidance of the guiding device.

In some embodiments, the camera assembly may include a fixed holder, a support device comprising a first magnetic structure, a guiding device connected to the fixed holder and the support device, a camera module arranged on the support device, and a second magnetic structure configured to generate a magnetic field. The support device is slidably connected to the fixed holder by the guiding device; the second magnetic structure interacts with the first magnetic structure to apply a force to drive the support device to slide in a sliding direction of the support device relative to the fixed holder under the guidance of the guiding device, and the camera module is driven to move out of or in the fixed holder.

The support device may include a bracket defining a first groove, and a first through hole may be defined by a bottom wall of the first groove; the camera module is accommodated in the first groove; an axis of the camera module may be coincided with the axis of the first through hole; the fixed holder may include a base portion, an axis of the first through hole may be perpendicular to the base portion.

The bracket may include a main body portion and a mating portion connected with the main body portion; the first groove is defined in the main body portion. The guiding device may include a roller hinged with the mating portion, the fixed holder is provided with a guiding slot corresponding to the roller, the roller rolls along the guiding slot.

The guiding slot is defined in the base portion; or the fixed holder may include guiding walls disposed at opposite ends of the base portion perpendicular to the sliding direction of the support device; each of the guiding slots are defined in a corresponding guiding wall.

The guiding slot is defined in the base portion; or the number of the guiding slot is two; the fixed holder may include two guiding walls disposed at opposite ends of the base portion perpendicular to the sliding direction of the support device; each of the guiding slots are defined in a corresponding guiding wall. The number of the roller is two; the two rollers are arranged on opposite sides of the mating portion perpendicular to the sliding direction of the support device; each of the rollers is arranged on a corresponding side of the mating portion.

The support device may include a magnetic block with magnetic, the magnetic block is the first magnetic structure; the bracket defines a second through hole, and the magnetic block is accommodated in the second through hole; the second magnetic structure interacts with the magnetic block.

The first magnetic structure is a magnetic block; the bracket defines a second through hole, and the magnetic block is accommodated in the second through hole; the second magnetic structure is an electromagnet, the electromagnet interacts with the magnetic block.

The support device may include a magnetic block with magnetic, the magnetic block is the first magnetic structure; the bracket defines a second groove, and the magnetic block is accommodated in the second groove; the second magnetic structure interacts with the magnetic block.

The first magnetic structure is a magnetic block; the bracket defines a second groove, and the magnetic block is accommodated in the second groove; the second magnetic structure is an electromagnet, the electromagnet interacts with the magnetic block.

The base portion of the fixed holder is provided with limiting stop walls at opposite ends of the support device in the sliding direction, a first opening for the bracket to slide out is defined in one of the limiting stop walls which is configured to restrict the bracket from sliding out from the first opening.

The base portion of the fixed holder is provided with limiting stop walls at opposite ends of the support device in the sliding direction, a first opening for the bracket to slide out is defined in one of the limiting stop walls away from the second magnetic structure which is configured to restrict the entire bracket from sliding out from the first opening.

The base portion of the fixed holder is provided with a second opening corresponding to the sliding position of the bracket, the first opening and the second opening communicate with each other, the bracket protrudes from the second opening to reduce thickness of the camera assembly in an axial direction of camera module.

The camera module is kept at a state of out of the fixed holder by a repulsive force between the first magnetic structure and the second magnetic structure, or kept at a state of in the fixed by an attractive force between the first magnetic structure and the second magnetic structure.

Another aspect of the present disclosure may provide a mobile terminal. The mobile terminal may include a display assembly configured to display information, a housing assembly, and a camera assembly arranged in the housing assembly. The display assembly is mounted on the housing assembly. At least a part of the camera assembly is stacked with a display area of the display assembly in a non-extended state. The camera assembly may include a support device, a guiding device, a camera module and a second magnetic structure, the support device is slidably connected to the housing assembly through the guiding device; the second magnetic structure is configured to apply a force to drive the support device to slide under the guidance of the guiding device, and the camera module is driven to extend out of the housing assembly.

Another aspect of the present disclosure may provide an electronic apparatus. The electronic apparatus may include a display assembly configured to display information, a housing assembly, and a camera assembly arranged in the housing assembly. The display assembly is mounted on the housing assembly. At least a part of the camera assembly is stacked with a display area of the display assembly in a non-extended state. The camera assembly may include a support device including a first magnetic structure, a guiding device, a camera module and a second magnetic structure, the support device is slidably connected to the housing assembly through the guiding device; the camera module is arranged on the support device; the second magnetic structure interacts with the first magnetic structure to apply a force to drive the support device to slide under the guidance of the guiding device, and the camera module is driven to extend out of or retract in the housing assembly.

The camera assembly further may include a fixed holder connected to the housing assembly; the support device comprises a first magnetic structure; the guiding device is connected to the fixed holder and the support device; the camera module is arranged on the support device; the second magnetic structure is configured to generate a magnetic field, and the second magnetic structure interacts with the first magnetic structure to apply a force to drive the support device to slide in a sliding direction of the support device.

The camera assembly further comprises a fixed holder connected to the housing assembly; the support device is slidably connected to the fixed holder by the guiding device.

The housing assembly may include a shell and a dust shield, the display assembly is mounted on the shell, the camera assembly is provided in the shell and capable of extending from an end of the shell to the outside of the shell, the end of the shell defines an opening hole through which the camera assembly slides out, the dust shield is accommodated in the opening hole and close the opening hole, the dust shield is resiliently hinged to the shell. The dust shield is pushed out of the opening hole by the camera assembly when the camera assembly is in an extended state, and the dust shield rebounds automatically to and accommodated in the opening hole when the camera assembly is in a non-extended state.

The support device may include a bracket defining a first groove, and a first through hole is defined by a bottom wall of the first groove, the camera module is accommodated in the first groove, an axis of the camera module is coincided with an axis of the first through hole; the fixed holder comprises a base portion, the axis of the first through hole is perpendicular to the base portion.

The bracket may include a main body portion and a mating portion connected with the main body portion; the first groove is defined in the main body portion; the guiding device may include a roller hinged with the mating portion, the fixed holder is provided with a guiding slot corresponding to the roller, the roller rolls along the guiding slot.

The guiding slot is defined in the base portion; or the fixed holder comprises guiding walls disposed at opposite ends of the base portion perpendicular to the sliding direction of the support device; each of the guiding slots are defined in a corresponding guiding wall.

The guiding slot is defined in the base portion; or the number of the guiding slot is two; the fixed holder comprises two guiding walls disposed at opposite ends of the base portion perpendicular to the sliding direction of the support device; each of the guiding slots are defined in a corresponding guiding wall. The number of the roller is two; the two rollers are arranged on opposite sides of the mating portion perpendicular to the sliding direction of the support device; each of the rollers is arranged on a corresponding side of the mating portion.

The support device comprises a magnetic block with magnetic, the magnetic block is the first magnetic structure; the bracket defines a second through hole, and the magnetic block is accommodated in the second through hole; the second magnetic structure interacts with the magnetic block.

The first magnetic structure is a magnetic block; the bracket defines a second through hole, and the magnetic block is accommodated in the second through hole; the second magnetic structure is an electromagnet, the electromagnet interacts with the magnetic block.

The base portion of the fixed holder is provided with limiting stop walls at opposite ends of the support device in the sliding direction, a first opening for the bracket to slide out is defined in one of the limiting stop walls which is configured to restrict the bracket from sliding out of the first opening.

The base portion of the fixed holder is provided with limiting stop walls at opposite ends of the support device in the sliding direction, a first opening for the bracket to slide out is defined in one of the limiting stop walls which is configured to restrict the entire bracket from sliding out of the first opening.

The base portion of the fixed holder is provided with a second opening corresponding to the sliding position of the bracket, the first opening and the second opening communicate with each other, the bracket protrudes from the second opening to reduce thickness of the camera assembly in an axial direction of camera module.

Another aspect of the present disclosure may provide a mobile terminal. The mobile terminal may include a processor and a camera assembly connected to the processor. The camera assembly comprises a support device, a guiding device, a camera module and a second magnetic structure. The camera module is arranged on the support device; the processor is configured to receive a control instruction to control the second magnetic structure to apply a force to drive the support device to slide under the guidance of the guiding device.

Another aspect of the present disclosure may provide an electronic apparatus. The electronic apparatus may include a processor and a camera assembly connected to the processor. The camera assembly may include a fixed holder, a support device including a first magnetic structure, a guiding device, a camera module and a second magnetic structure. The camera module is arranged on the support device; the support device is slidably connected to the fixed holder by the guiding device; the processor is configured to receive a control instruction to control the second magnetic structure to generate a repulsive force or a attractive force between the first magnetic structure and the second magnetic structure to drive the support device to slide under the guidance of the guiding device relative to the fixed holder, such that camera module is driven to move between an extended state and a non-extended state.

The mobile terminal may further include a display assembly, the control instruction is generated by the display assembly after the display assembly receives a touch instruction of mobile payment, and the camera module slides out of the mobile terminal under the controlling of the processor to perform face recognition.

The mobile terminal may further include a display assembly, the control instruction is generated by the display assembly after the display assembly receives a touch instruction of taking a picture, and the camera module slides out of the mobile terminal under the controlling of the processor to acquire image information of a subject.

Figure 2:
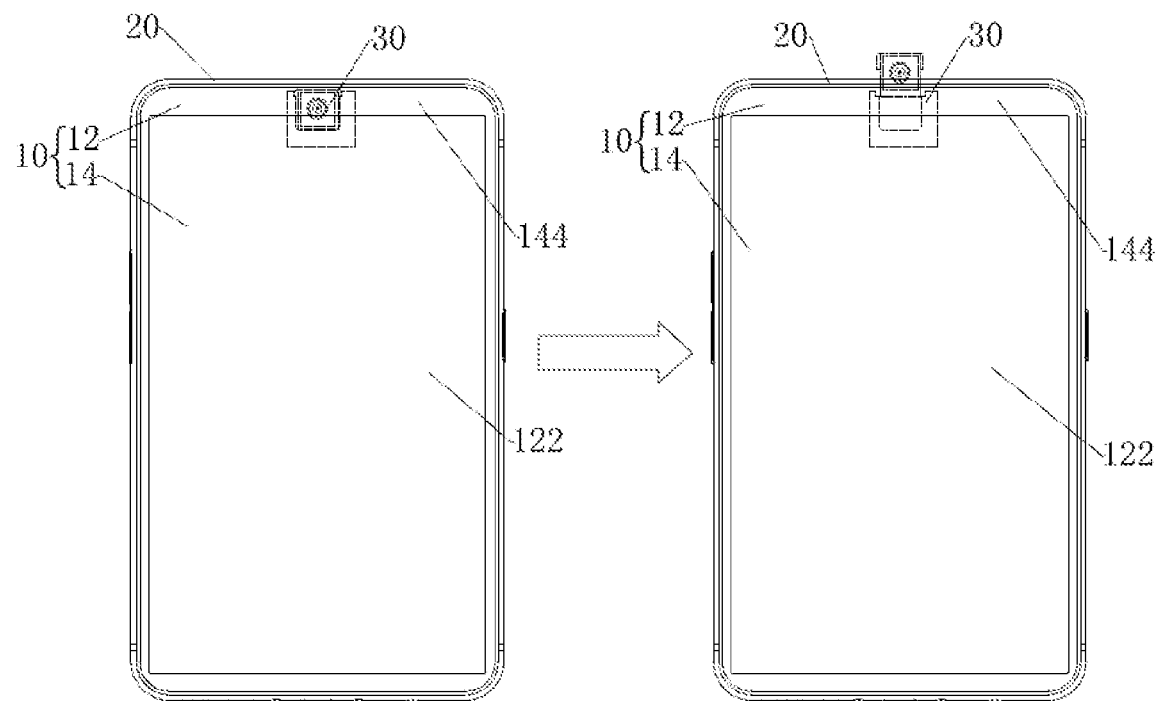
FIG. 2 is a schematic view of a partial stack-up relationship between a camera assembly and a display assembly according to an embodiment of the present disclosure.

Referring to FIG. 1 and FIG. 2, FIG. 1, an exploded schematic view of a mobile terminal of the present disclosure and a schematic view of a partial stack-up relationship between a camera assembly and a display assembly of the present disclosure are depicted.

A mobile terminal may include a display assembly 10, a housing assembly 20 and a camera assembly 30, the display assembly 10 may be mounted on the housing assembly 20, the camera assembly 30 may be provided in the housing assembly 20 and capable of extending to the outside of the housing assembly 20 from an end of the housing assembly 20, at least a part of the camera assembly 30 may be stacked with a display area 122 of the display assembly 10 in a non-extended state. Mobile terminals may include smart phones, tablet PCs, laptop PCs, smart watches and PDAs, etc.

The display assembly 10 may include a panel 12 and a display screen 14, the panel 12 is arranged on a side of the display screen 14 away from the housing assembly 20, the panel 12 may cover on the housing assembly 20. The panel 12 may be provided with a display area 122 configured to expose the information displayed by the display screen 14, as well as a non-display area 144 blocking the display screen 14 from glowing outwards. The display screen 14 may be used to display information, such as images, videos or texts. The non-display area 144 could also be used to reserve installation space for other components such as an earpiece or a sensor.

Figure 3:
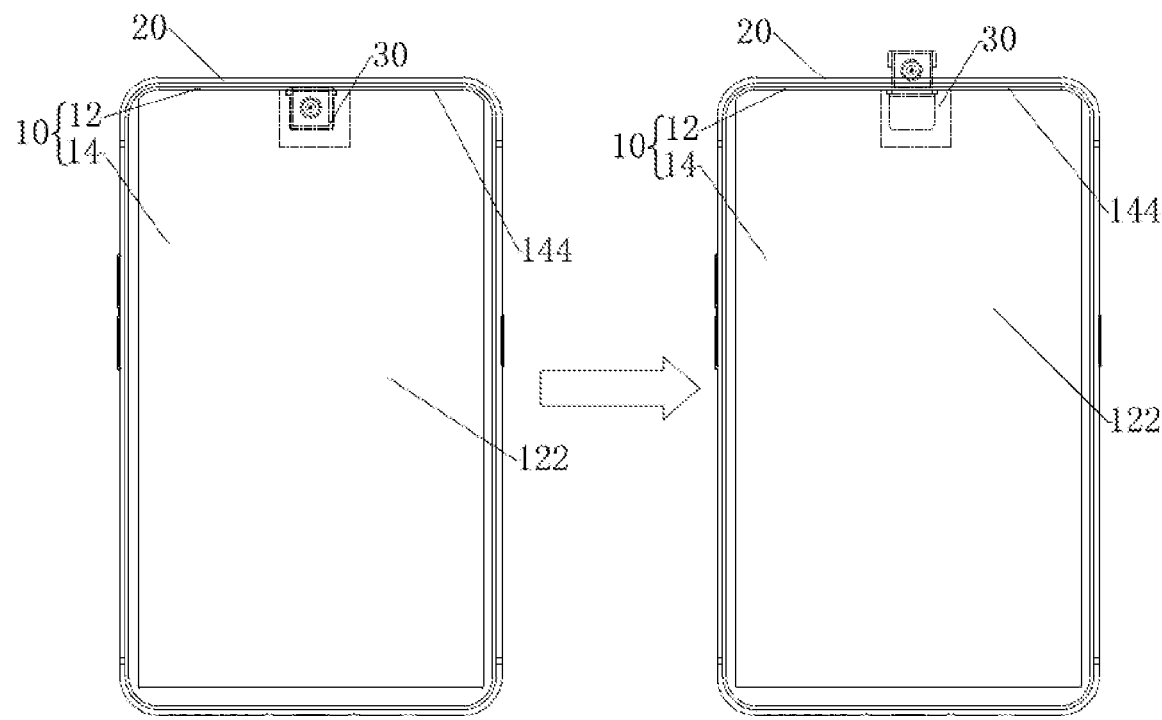
FIG. 3 is a schematic view of an entirely stack-up relationship between a camera assembly and a display assembly according to an embodiment of the present disclosure.

At least partial area of the camera assembly 30 may be stacked with a display area 122 of the display assembly 10 in a non-extended state. In some embodiments, partial area of the camera assembly 30 may be stacked with a display area 122 of the display assembly 10 in a non-extended state, the camera assembly 30 may be capable of extending from the end of the housing assembly 20 to the outside of the housing assembly 20, and then the camera assembly 30 partly does not occupy the space of the display area 122, such that the area of the display area 122 could be increased and the area of the non-display area 144 could be reduced. Referring to FIG. 3, a schematic view of an entirely stack-up relationship between a camera assembly and a display assembly of the present disclosure is depicted. In other embodiments, the entire area of the camera assembly 30 may be stacked with the display area 122 of the display assembly 10 when the camera assembly 30 is in the non-extended state, the camera assembly 30 may be capable of extending from the end of the housing assembly 20 to the outside of the housing assembly 20, and then the camera assembly 30 entirely does not occupy the space of the display area 122, such that the area of the display area 122 may be further expended and the area of the non-display area 144 may be further reduced.

A component that needs to occupy the space of the display area 122, such as an earpiece or a sensor, can be arranged on the other position except the non-display area 144. For example, the component such as an ear piece or a sensor can be disposed on the camera assembly 30, such that the area of the display area 122 may be further expended, and the area of the non-display area 144 may be further reduced, thus the display area 122 can almost completely replace the spatial position of the non-display area 144.

Figure 4:
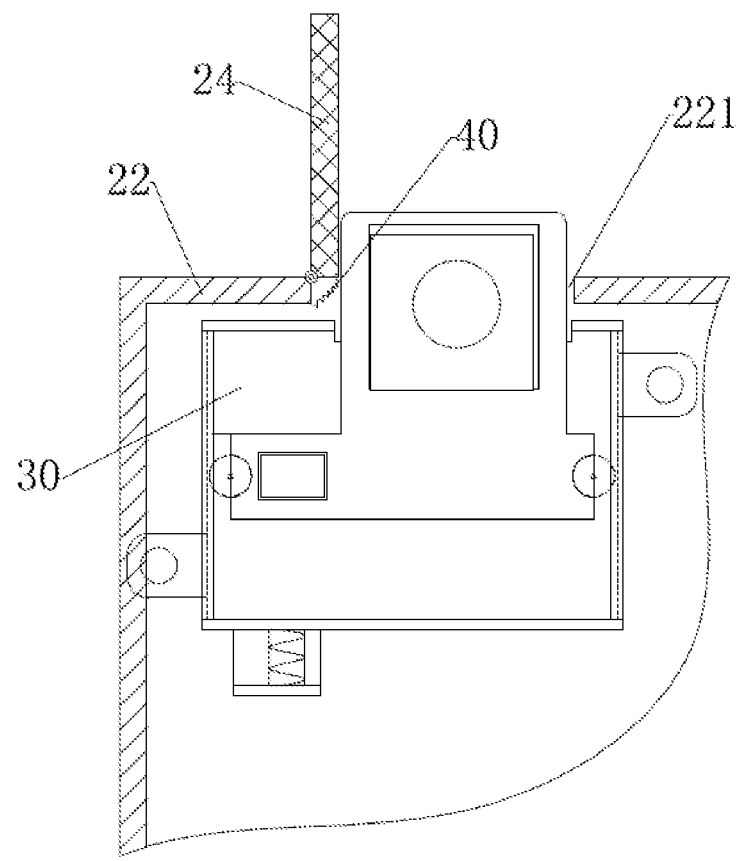
FIG. 4 is a sectional schematic view of a camera assembly area of a mobile terminal according to an embodiment of the present disclosure.

Referring to FIG. 1 and FIG. 4, FIG. 4 is a sectional schematic view of a camera assembly area of a mobile terminal of the present disclosure.

The housing assembly 20 may include a shell 20 and a dust shield 24, the panel 12 may be disposed on the housing assembly 22, the display screen 14 may be interposed between the panel 12 and the housing assembly 22. The camera assembly 30 provided in the shell 22 may be capable of extending from the end of the shell 22 to the outside of the shell 22. The shell may be provided with an opening hole 221 at the end of the shell 22 where the camera assembly 30 slides out. The dust shield 24 may be accommodated in the opening hole 221 and close the opening hole 221, the dust shield 24 and the shell 22 may be capable of hinging in a spring-back way, and the dust shield 24 may be used to prevent external dust from entering the inside of the mobile terminal. Optionally, the shell 22 may include a front shell 222 and a rear shell 224, the front shell 222 may be fixed on the rear shell 224 to form a mounting space, and the camera assembly 30 may be mounted in the mounting space. The panel 12 may be disposed on the front housing 222 and cover the front housing 22. The rear shell 224 can be correspondingly provided with the opening hole 221. The dust shield 24 may be accommodated in the opening hole 221, and capable of hinging to the rear shell 224 in a spring-back way. The opening hole 221 can also be provided on the front shell 222, the shell can also include a middle frame (not shown in FIG. 1), and the opening hole 221 can also be provided on the middle frame, which is not limited herein.

Specifically, the dust shield 24 may be hinged to the shell 22 so that the dust shield 24 can rotate around the shell 22, the dust shield 24 may be connected with the shell 22 by an elastic component 40, and the elastic component 40 elastically shrinks to pull the dust shield 24 back into the opening hole 221. The elastic component 40 may be a spring, an iron elastic piece, or other telescopic components. The dust shield 24 may be pushed out the opening hole 221 by the camera assembly 30 when the camera assembly 30 is in an extended state, and the dust shield 24 may be rebounded automatically and accommodated in the opening hole 221 when the camera assembly 30 is in a non-extended state.

Figure 5:
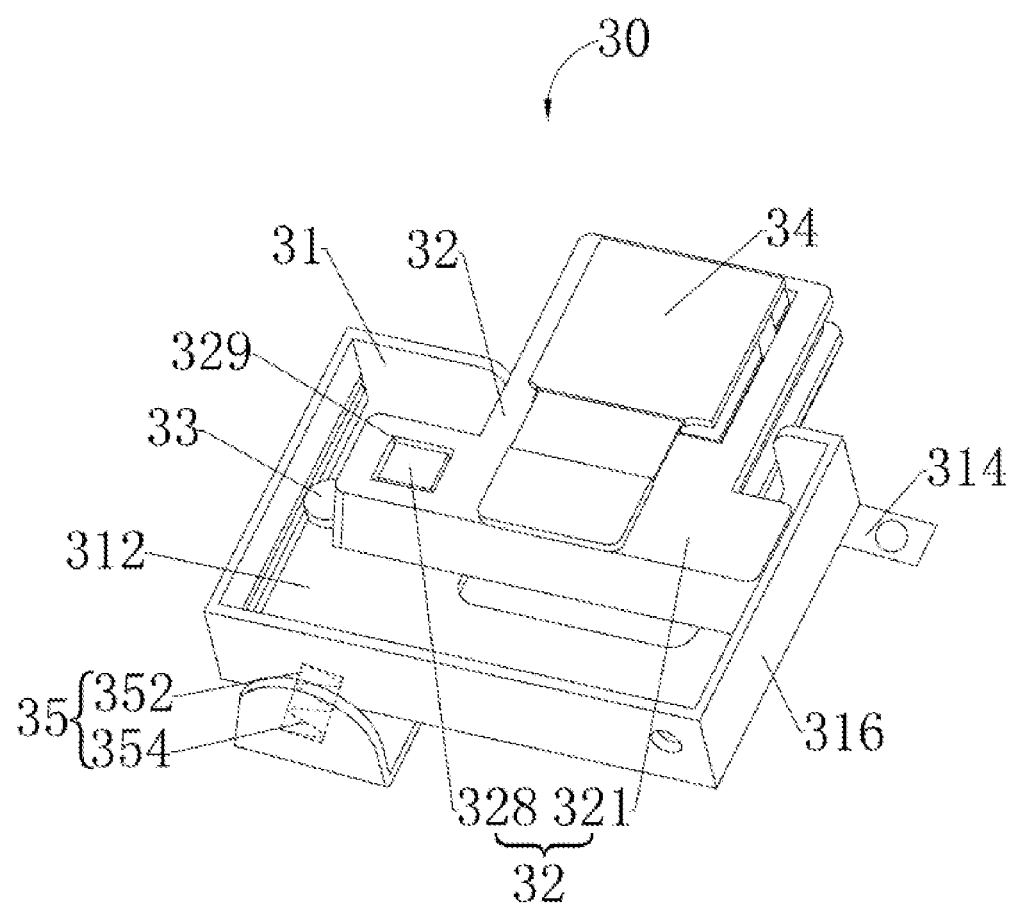
FIG. 5 is a schematic view of a camera assembly according to an embodiment of the present disclosure.

Referring to FIG. 5, FIG. 5 is a schematic view of a camera assembly according to an embodiment of the present disclosure.

The camera assembly 30 may include a fixed holder 31, a support device 32, a guiding device 33, a camera module 34 and a second magnetic structure 35. The support device 32 may include a first magnetic structure being used to generate a magnetic field. The guiding device 33 may be respectively connected with the fixed holder 31 and the support device 32. The support device 32 may be slidably connected to the fixed holder 31 by the guiding device 33. The camera module 34 may be disposed on the support device 32. The support device 32 may slide under the action of external force, thereby driving the camera module 34 to slide. The second magnetic structure 35 may be used to generate a magnetic field, interacting with the magnetic field generated by the first magnetic structure of the support device 32, so as to apply a force to drive the support device 32 to slide in the sliding direction of the support device 32, therefore the support device 32 could slide stably under the guidance of the guiding device 33.

The second magnetic structure 35 could generate a magnetic field in an energized state, and could change the direction of the magnetic field according to a direction of the electric current, thereby applying an attractive force or a repulsive force to the support device 32. In addition, the second magnetic structure 35 could determine the strength of the magnetic field according to the magnitude of the electric current, thereby applying different magnitudes of force to the support device 32. The second magnetic structure 35 may include an iron core 352 and a conductive coil 354 wound around the outside of the iron core 352, the iron core 352 may be in a shape of a strip or a shoe, so as to make the iron core 352 more easily be magnetized to generate a stronger magnetic field when the magnitudes of electric current are same. In addition, the material of the iron core 352 may be made of soft iron or silicon steel, such that the second magnetic structure 35 can be immediately degaussed when in a case of power outage, or the direction of the magnetic field can be immediately changed when the direction of the electric current changes, which significantly improves the sliding stability and accuracy of the camera module 34.

The fixed holder 31 may be constituted by parts of a front shell, a rear shell or other components of the mobile terminal, and the fixed holder 31 may also be a separate component, the fixed holder 31 may include a base portion 312 and a mounting portion 314 connected to the base portion 312. The fixed holder 31 may be fixedly connected to the front shell 222, the rear shell 224 or other components of the mobile terminal through the mounting portion 314, and the base portion 312 may be used for mounting components including the support device 32, the guiding device 33, and the camera module 34. The second magnetic structure 35 can be mounted on the base portion 312 or can be mounted in other positions of the mobile terminal except the base portion 312, which is not limited herein.

Figure 6:
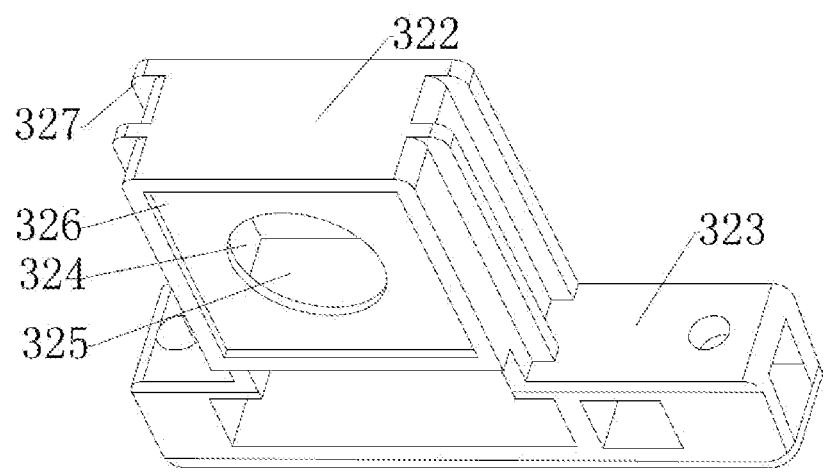
FIG. 6 is a perspective schematic view of the bracket in FIG. 5.

Referring to FIG. 6 in the meantime, FIG. 6 is a perspective schematic view of the bracket in FIG. 5.

The support device may include a bracket 321, the bracket 321 may include a main body portion 322 and a mating portion 323 connected with the main body portion 322, the first groove 324 may be defined in the main body portion 322, and a first through hole 325 may be defined in a bottom wall of the first groove 324, the axis of the first through hole 325 may be perpendicular to the base portion 312, the camera module 34 may be accommodated in the first groove 324, the axis of the camera module 34 may be coincided with the axis of the first through hole 325, in order to allow the camera module 34 to completely receive external light, and a higher quality image can be taken. The outer side of the retaining wall of the first groove 324 may be provided with a reinforcing rib 327 for improving the strength of the bracket 321 to prevent the bracket 321 from being damaged during the sliding telescoping, and damages the camera module 34.

The other side of the bottom wall of the first groove 324 may be provided with a lens groove 326, the camera assembly 30 may include a lens (not shown in FIG. 5), and the lens groove 326 may be used to mount the lens to prevent external dust or moisture from entering the camera module 34. The lens may be completely accommodated in the lens groove, that is, the side of the lens away from the camera module 34 may be lower than the top surface of the retaining wall of the lens groove 326, so that the retaining wall of the lens groove 326 of the bracket resists the external impact on the lens, and effectively reduces the possibility of damaging the lens when the mobile terminal falls.

Optionally, in another embodiment, a partial structure of the bracket 321 may have magnetism as a first magnetic structure, and the first magnetic structure generating a magnetic field interacting with the energized second magnetic structure 35. The bracket 321 can also be entirely magnetic, and the bracket 321 as a whole may be the first magnetic structure, and a magnetic field may be generated to interact with the energized second magnetic structure 35. The magnetic structure of the bracket 321 may be made of magnetic materials such as iron, cobalt, nickel, or an alloy thereof. The magnetic structure and the non-magnetic structure can be manufactured by an integral molding technique, and the magnetic structure and the non-magnetic structure can also be separately manufactured and then formed a whole.

Continuing to refer FIG. 5, the support device 32 includes a bracket 321 and a magnetic block 328. This embodiment differs from the above embodiments in that the bracket 321 does not have magnetism, the magnetic block 328 generates magnetism, and the magnet block 328 may serve as the first magnetic structure. The magnetic block 328 may be used to generate a magnetic field to interact with the magnetic field generated by the energized second magnetic structure 35, thereby applying a force to the magnetic block 328. The magnetic block 328 may drive the bracket 321 to slide, and the bracket 321 may drive the camera module 34 to slide under the guiding of the guiding device 33, thereby achieving the purpose of freely telescoping of the camera module 34.

The bracket 321 may define a second through hole 329, and the magnetic block 328 may be accommodated in the second through hole 329 and be in contact with the fixed holder 31, that is, the second through hole 329 and the fixed holder 31 may be arranged to be a groove, and the magnetic block 328 may be accommodated in this groove to fix the magnet block 328 at a limited position. This arrangement can increase the accommodation space of the magnet block 328, thereby increasing the volume of the magnet block 328, such that the magnet block 328 can generate a stronger magnetic field. Of course, in an understandable range, the magnetic block 328 can be directly mounted in the second through hole 329 and not in contact with the fixed holder 31, which is not limited herein.

The bracket 321 can also be directly provided with a second groove (not shown in FIG. 5), and the magnetic block 328 may be fixed in the second groove. This arrangement can facilitate the fixed installation between the magnet block 328 and the bracket 321. During the sliding of the bracket 321, the bottom wall of the second groove may act as a support for the magnet block 328, so as to increase the structural stability of the magnet block 328.

Figure 7:
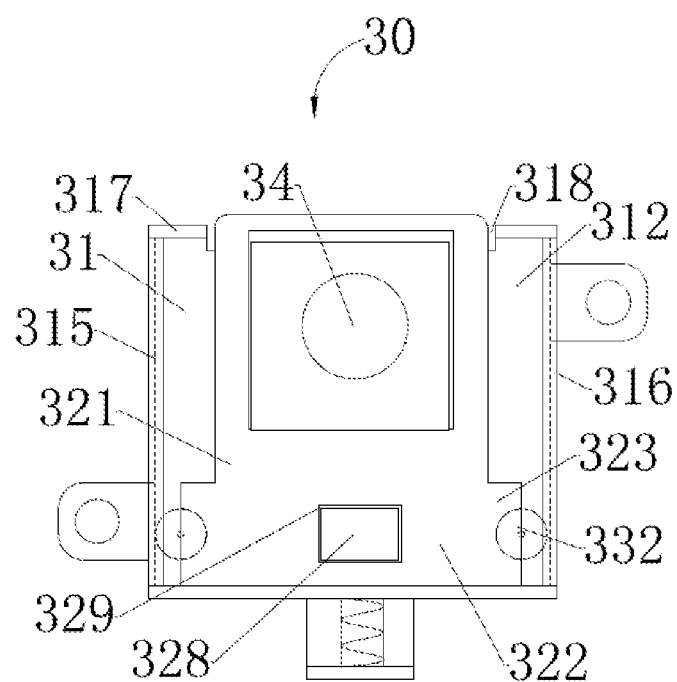
FIG. 7 is a schematic view of the fixed holder and the support device according to an embodiment of the present disclosure, wherein the magnet is arranged on the main body portion of a bracket.

Referring to FIG. 7, FIG. 7 is a schematic view of arranging a magnet block 328 on the main body portion 322 of a bracket 321 according to an embodiment of the present disclosure.

The second through hole 329 or the second groove may be provided on the main body portion 322 of the bracket 321 such that the space occupied by the mating portion 323 becomes smaller, and the camera assembly 30 may be more compact. In addition, the second through hole 329 or the second groove may be disposed in the main body portion 322, and the magnetic block 328 may be accommodated in the second through hole 329 or the second groove, so that the external force on the bracket 321 may be closer to the center of gravity thereof, thereby the sliding stability of the bracket 321 may be further enhanced. It can be understood that the closer the second through hole 329 or the second groove is to the center of gravity of the bracket 321, the better the stability of the bracket 321 sliding. The second through hole 329 or the second groove can also be disposed on the mating portion 323 of the bracket 321, which is not limited herein.

The guiding device 33 may include rollers 332. The rollers 332 may be hinged with the mating portion 323 of the bracket 321. The fixed holder 31 may be provided with a guiding slot 315 corresponding to the roller 332. The rollers 332 may roll along the guiding slot 315 to increase the sliding stability of the bracket 321. The friction between the rollers 332 and the guiding slot 315 may be rolling friction, and the friction between the rollers 332 and the guiding slot 315 may be small, which can effectively reduce energy loss.

Specifically, there are at least two rollers 332, the rollers 332 may be distributed at opposite ends of the bracket 321, the number of the rollers 332 can be two, three, or four, and the number of the roller 332 may be not listed here. When the number of the rollers 332 is an odd number, the rollers 332 may be alternately mounted on opposite ends of the bracket 321. In this embodiment, the number of the rollers 332 is two, and the sliding stability of the bracket 321 may be further improved without occupying too much space.

The guiding groove 315 may be defined in the base portion 312 of the fixed holder 31, which is advantageous because the opening direction of the guiding groove 315 is the same as the opening and closing direction of the mold of manufacturing the fixed holder 31, so that the normal depanning of the fixed holder 31 may be not affected. Thereby, the production cost of the mold for producing the fixed holder 31 could be lowered.

The guiding groove 315 can also be disposed on the guiding walls 316 of the fixed holder 31. The guiding walls 316 may be disposed at opposite ends of the base portion 312 perpendicular to the sliding direction of the support device 32, such that the guiding groove 315 and the rollers 332 can be disposed at the width direction of the camera assembly 30, thereby reducing the thickness of the camera assembly 30, which makes the thickness of the mobile terminal even smaller.

The guiding groove 315 can also be replaced by a component with a guiding groove 315, directly mounted on the guiding wall 316 of the fixed holder 31 or the base portion 312.

The fixed holder 31 may further include limiting stop walls 317. The base portion 312 of the fixed holder 31 may be provided with limiting stop walls 317 at opposite ends of the support device 32 in the sliding direction, and the limiting stop walls 317 may be used for restricting the sliding of the bracket 321. During the process of over-extending or over-retracting the bracket 321 to the fixed bracket 321, the bracket 321 may be in contact with a corresponding limiting stop wall 317, and then preventing the bracket 321 from separating from the fixed holder 31. The limiting opening wall 317 of the fixed holder 31 away from the one end of the second magnetic structure 35 may be provided with a first opening 318 for the bracket 321 to slide out. The bracket 321 may drive the camera module 34 to extend from the first opening 318, and extend from the inside of mobile terminal to the outside of the mobile terminal, thereby finishing shooting and collecting data.

Figure 8:
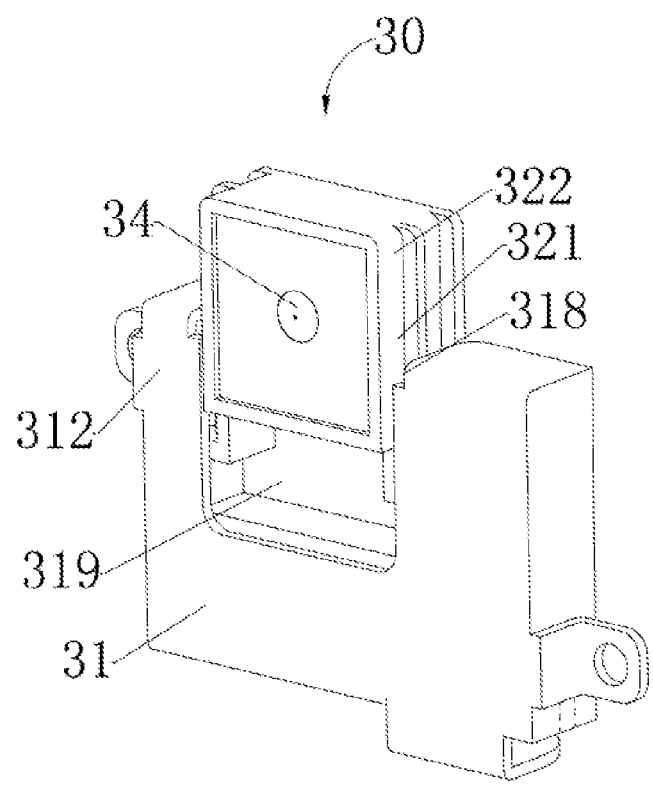
FIG. 8 is a schematic view of another angle of a camera assembly according to an embodiment of the present disclosure.

Referring to FIG. 8, FIG. 8 is a schematic view of another angle of a camera assembly according to an embodiment of the present disclosure.

In the axis of the camera module 34, the base portion 312 of the fixed holder 31 can be provided with a second opening 319 corresponding to the sliding position of the bracket 321, the sliding position of the bracket 321 may be a position corresponding to the bracket 321 in maximum extending or in maximum retracting. Specifically, the sliding position of the bracket 321 may be a position of the main body portion 322 corresponding to the bracket 321 in maximum extending or in maximum retracting. The first opening 318 and the second opening 319 may communicate with each other. The bracket 321 could protrude from the second opening 319, that is, the side of the bracket 321 away from the camera module 34 may extend beyond the second opening 319, such that the thickness of the camera assembly 30 in the axial direction of camera module 34 could be reduced. Therefore, the camera assembly 30 could be smaller, and less space inside the mobile terminal is occupied.

In this embodiment, the camera module 34 may be disposed on the support device 32, the support device 32 may have a first magnetic structure, the support device 32 may be slidably connected to the fixed holder 31 through the guiding device 33. The second magnetic structure 35 may be used to generate a magnetic field, and the second magnetic structures 35 interact with the first magnetic structure of the support device 32 to apply a force for the support device 32 to slide in the sliding direction of the support device 32, thereby driving the support device 32 under the guidance of the guiding device 33, and then the support device 32 may drive the camera module 34 to slide, so as to achieve the purpose of making the camera module 34 freely telescoping.

In addition, the support device 32, the guiding device 33 and the camera module 34 may be integrally disposed on the fixed holder 31. When the camera assembly 30 is installed and replaced, the camera assembly 30 can be replaced as a whole, and the mounting and replacement efficiency of the camera assembly 30 could be improved.

When the camera assembly 30 is used in a mobile terminal, such as a mobile phone, a tablet or a smart watch, which needs to use the camera module 34 to photograph, the camera module 34 may be retracted into the shell 22 of the mobile terminal if the camera module 34 is not required to take a picture; the camera module 34 may be extended outside the shell 22 of the mobile terminal if it is necessary to take a picture using the camera module 34. Thus, the camera assembly 30 does not occupy the space of the non-display area 144 of the display assembly 10, and the area of the display area 122 of the display assembly 10 is further enlarged, and the area of the non-display area 144 may be further reduced, thereby improving the overall aesthetics of the mobile terminal. In addition, the second magnetic structure 35 can achieve the purpose of applying different magnitudes of force to the support device 32 by controlling the magnitude of the electric current, thereby accurately controlling the sliding position of the support device 32 to meet different photographing experiences of users. The support device 32 may slide smoothly under the guiding action of the guiding device 33, thereby reducing the shake of the camera module 34, improving the life and shooting quality of the camera module 34.

Figure 9:
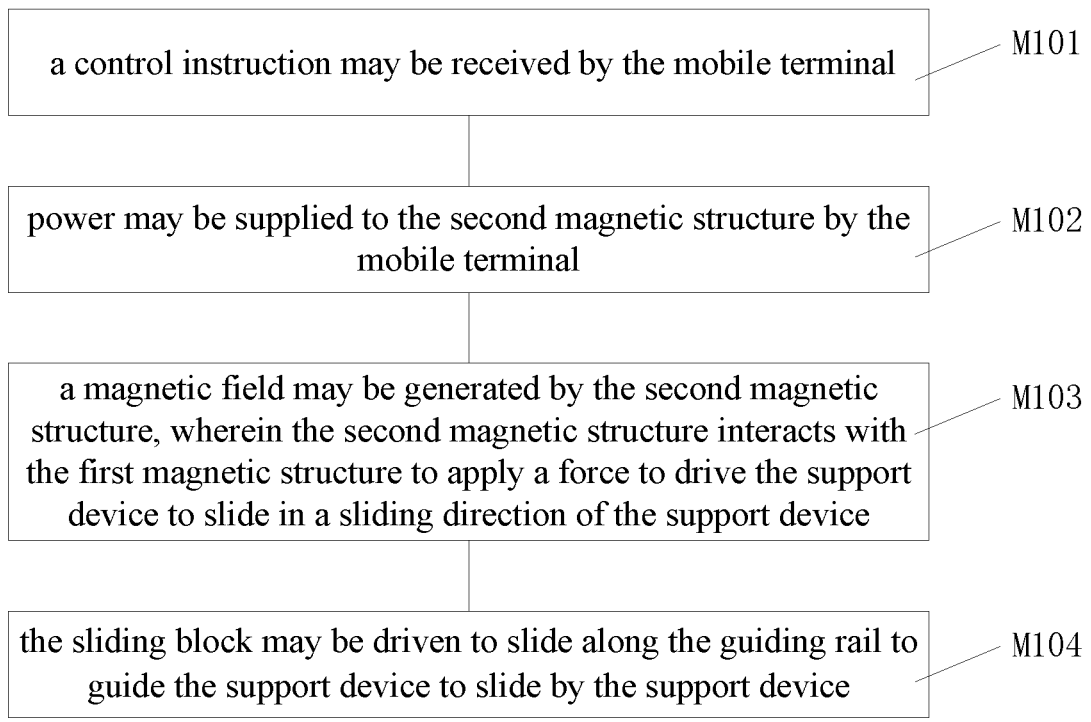
FIG. 9 is a flow chart diagram of a control method of a camera assembly of a mobile terminal according to an embodiment of the present disclosure.

Referring to FIG. 5 and FIG. 9, FIG. 9 is a flow schematic view of a control method of a camera assembly of a mobile terminal according to an embodiment of the present disclosure. Wherein, the camera assembly 30 may include a fixed holding 31, a support device 32, a guiding device 33, a camera module 34 and a second magnetic structure 35. The support device 32 may have a first magnetic structure, and the guiding device 33 may connect with the fixed holder 31 and the support device 32 respectively. The support device 32 may be slidably connected to the fixed holder 31 via the guiding device 33, and the camera module 34 may be disposed on the support device 32.

M101: a control instruction may be received by the mobile terminal.

The control instructions received by the mobile terminal include instructions for starting a photographing, ending a photographing, starting a video chat, ending a video chat, starting a recording, and ending a recording, etc., which require a camera to cooperate.

M102: power may be supplied to the second magnetic structure by the mobile terminal.

When the control instruction is an instruction to start the camera operation, the mobile terminal may supply a forward current to the second magnetic structure 35. When the control instruction is an instruction to end the camera operation, the mobile terminal may supply a reverse current to the second magnetic structure 35. The forward current may refer to an electric current that causes the second magnetic structure 35 to generate a magnetic field contrary to the magnetic field generated by the first magnetic structure of the support device 32 such that the second magnetic structure 35 can give the support device 32 a force away from the second magnetic structure 35. The reverse current may refer to an electric current that causes the second magnetic structure 35 to generate the same magnetic field as the magnetic field generated by the first magnetic structure of the support device 32 such that the second magnetic structure 35 can give the support device 32 a force close to the second magnetic structure 35. In addition, the magnitude of the electric current can control the strength of the magnetic field of the second magnetic structure 35, thereby controlling the force that the second magnetic structure 35 supplies to the support device 32.

M103: a magnetic field may be generated by the second magnetic structure, wherein the second magnetic structure interacts with the first magnetic structure to apply a force to drive the support device to slide in a sliding direction of the support device.

The second magnetic structure 35 may generate a corresponding magnetic field according to the direction and the magnitude of the electric current, and the magnetic field generated by the second magnetic structure 35 may interact with the magnetic field generated by the first magnetic structure of the support device 32 to apply a driving force or a retracting force for the support device 32 to slide in the sliding direction of the support device 32. The driving force can drive the support device 32 to move away from the second magnetic structure 35, and the support device 32 may drive the camera module 34 to extend from the inside of the mobile terminal. The retracting force can bring the support device 32 close to the second magnetic structure 35, and the support device 32 may drive the camera module 34 to retract inside the mobile terminal.

M104: the sliding block may be driven to slide along the guiding rail to guide the support device to slide by the support device.

The second magnetic structure 35 may supply a driving force or a retracting force for the support device 32, and the support device 32 may slide smoothly under the guidance of the guiding device 33, thereby reducing the shake of the camera module 34 and improving the life of the camera module 34.

In this embodiment, the camera module 34 may be disposed on the support device 32. The support device 32 may include a first magnetic structure, the support device 32 may be slidably connected to the fixed holder 31 through the guiding device 33, and the second magnetic structure 35 may be used to generate a magnetic field. The second magnetic structures 35 may interact with the first magnetic structure of the support device 32 to apply a force for the support device 32 to slide in the sliding direction of the support device 32, thereby driving the support device 32 to slide under the guidance of the guide device 33. The sliding of the support device 32 may drive the camera module 34 to move so as to achieve the purpose of freely expanding and contracting the camera module 34. In addition, the support device 32, the guiding device 33 and the camera module 34 may be integrally disposed on the fixed holder 31. When the camera assembly 30 is installed and replaced, the camera assembly 30 can be replaced as a whole, and the mounting and replacement efficiency of the camera assembly 30 could be improved.

When the camera assembly 30 is used in a mobile terminal, such as a mobile phone, a tablet or a smart watch, which needs to use the camera module 34 to photograph, if the camera module 34 is not required to take a picture, the camera module 34 may be retracted into the shell 22 of the mobile terminal. If it is necessary to take a picture of the camera module 34, the camera module 34 may extend out of the shell 22 of the mobile terminal. Thus, the camera assembly 30 does not occupy the positional space of the non-display area 144 of the display assembly 10, and the area of the display area 122 of the display assembly 10 could be further enlarged, and the area of the non-display area 144 could be further reduced, thereby improving the overall appearance of the mobile terminal. In addition, the second magnetic structure 35 can achieve the purpose of applying different magnitudes of force to the support device 32 by controlling the magnitude of the current, thereby accurately controlling the sliding position of the support device 32 to meet different photographing experiences of the user. The support device 32 may slide smoothly under the guiding action of the guiding device 33, thereby reducing the jitter of the camera module 34, improving the life and shooting quality of the camera module 34.

Figure 10:
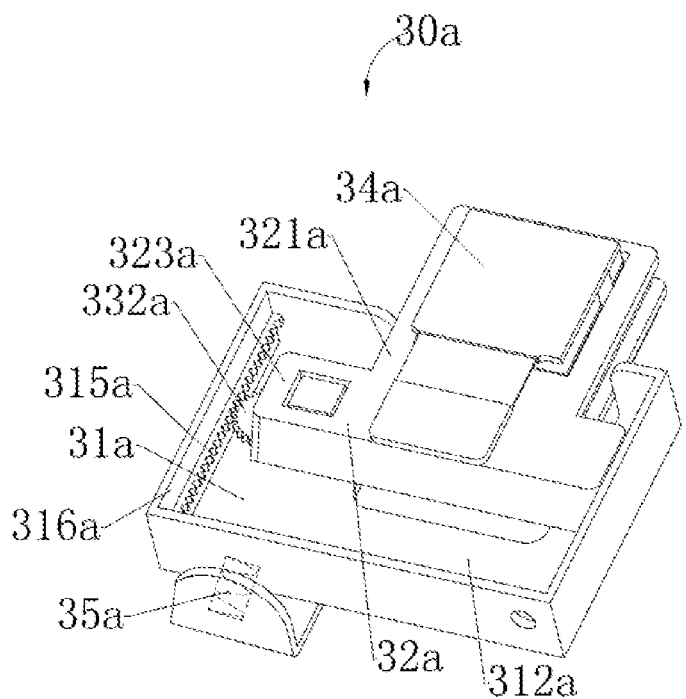
FIG. 10 is a schematic view of a camera assembly according to another embodiment of the present disclosure.

FIG. 10 is a schematic view of a camera assembly according to another embodiment of the present disclosure.

The camera assembly 30a of the present embodiment may be different from the camera assembly 30 of the previous embodiment. The guiding device 33a may include a gear 332a that may be hinged with the mating portion 323a of the bracket 321a, and the fixed holder 31a may be provided with a rack groove 315a corresponding to the gear 332a. The gear 332a may roll along the rack groove 315a to increase the sliding stability of the bracket 321a. Since the gear 332a and the rack groove 315a are in surface contact, and the projection of the rack groove 315a is engaged into a groove between two adjacent projections of the gear 332a, the gear 332a can stably slide on the rack groove 315a. The engaging structure of the rack groove 315a and the gear 332a can effectively avoid the support device 32a from continuing sliding caused by the delay of the magnetic disappearance of the second magnetic structure 35a, which could greatly improve the user experience.

Specifically, the quantity of the gears 332a may be at least two, the gears 332a may be arranged at opposite ends of the bracket 321a. The number of the gears 332a may be two, three or four, which is not limited herein. In this embodiment, the quantity of the gears 332a is two, and the sliding stability of the bracket 321a could be further improved without occupying excessive space.

The rack groove 315a may be disposed on the base portion 312a of the fixed holder 31a, and the arrangement is advantageous in that the opening direction of the rack groove 315a could be the same as the opening and closing direction of the mold for manufacturing the fixed holder 31a, such that the normality depanning of the fixed holder 31a may be not affected, which in turn could reduce the production cost of the mold for producing the fixed holder 31a.

The rack groove 315a may also be disposed on the guiding wall 316a of the fixed holder 31a. The guiding wall 316a may be disposed at opposite ends of the base portion 312a along a direction of substantially perpendicular to the sliding direction o support device 32a, such that the rack groove 315a and the gear 332a can be disposed in the width direction of the camera assembly 30a. Therefore, the thickness of the camera assembly 30a may be reduced, and the thickness of the mobile terminal can be made smaller.

The rack groove 315a may also be replaced by a rack with a rack groove 315a, which is mounted on the guiding wall 316a of the holder 31a or the base portion 312a.

In this embodiment, the camera module 34a may be disposed on the support device 32a. The support device 32a has a first magnetic structure, the support device 32a may be slidably connected to the fixed holder 31a by the guiding device 33a, and the second magnetic structure 35a may be used for generating a magnetic field. The second magnetic structures 35a may interact with the first magnetic structure of the support device 32a to apply a force for the support device 32a to slide in the sliding direction of the support device 32a, thereby driving the support device 32a to drive, thereby the camera module 34a is driven by the support device 32a under the guidance of the guiding device 33a, so as to achieve the purpose of freely extending and retracting of the camera module 34a.

Figure 11:
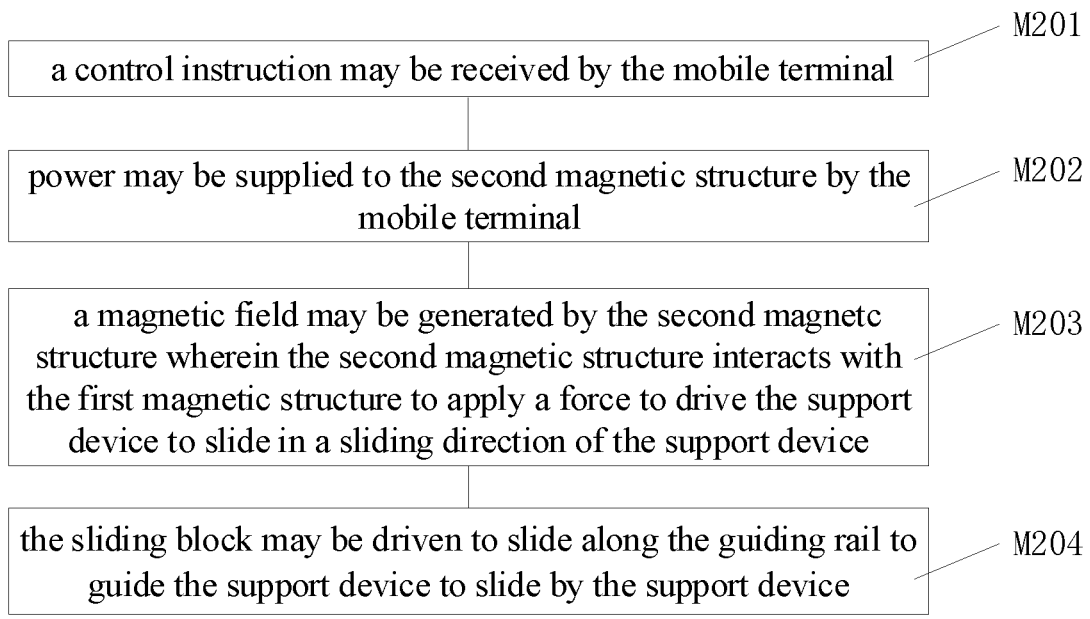
FIG. 11 is a flow chart diagram of a control method of a camera assembly of a mobile terminal according to another embodiment of the present disclosure.

Referring to FIGS. 10 to 11, a flow chart schematic view of a control method of a camera assembly of a mobile terminal according to another embodiment of the present disclosure is depicted. The camera assembly 30a may include a fixed holder 31a, a support device 32a, a gear 332a, a camera module 34a and a second magnetic structure 35a. The fixed holder 31a may be provided with a rack groove 315a. The support device 32a may have a first magnetic structure. The gear 332a and the support device 32a may be hinged, and the camera module 34a may be disposed on the support device 32a.

M201: a control instruction may be received by the mobile terminal.

The control instructions received by the mobile terminal include instructions for starting a photographing instruction, ending a photographing instruction, starting a video chat instruction, ending a video chat instruction, starting a recording instruction, and ending a recording instruction, and the like, which requires a camera to cooperate.

M202: power may be supplied to the second magnetic structure by the mobile terminal.

When the control instruction is an instruction to start the camera operation, the mobile terminal may supply a forward current to the second magnetic structure 35a. When the control instruction is an instruction to end the camera operation, the mobile terminal may supply a reverse current to the second magnetic structure 35a. The forward current may refer to an electric current that causes the second magnetic structure 35a to generate a magnetic field contrary to the magnetic field generated by the first magnetic structure of the support device 32a such that the second magnetic structure 35a can give the support device 32a a force away from the second magnetic structure 35a. The reverse current may refer to an electric current that causes the second magnetic structure 35a to generate the same magnetic field as the magnetic field generated by the first magnetic structure of the support device 32a such that the second magnetic structure 35a can give the support device 32a a force close to the second magnetic structure 35a. In addition, the magnitude of the electric current can control the strength of the magnetic field of the second magnetic structure 35a, thereby controlling the force that the second magnetic structure 35a supplies to the support device 32a.

M203: a magnetic field may be generated by the second magnetic structure wherein the second magnetic structure interacts with the first magnetic structure to apply a force to drive the support device to slide in a sliding direction of the support device.

The second magnetic structure 35 may generate a corresponding magnetic field according to the direction and the magnitude of the electric current, and the magnetic field generated by the second magnetic structure 35 may interact with the magnetic field generated by the first magnetic structure of the support device 32 to apply a driving force or a retracting force for the support device 32 to slide in the sliding direction of the support device 32. The driving force can drive the support device 32 to move away from the second magnetic structure 35, and the support device 32 may drive the camera module 34 to extend from the inside of the mobile terminal. The retracting force can bring the support device 32 close to the second magnetic structure 35, and the support device 32 may drive the camera module 34 to retract inside the mobile terminal.

M204: the sliding block may be driven to slide along the guiding rail to guide the support device to slide by the support device.

The second magnetic structure 35a may supply a driving force or a retracting force for the support device 32a, and the support device 32a may slide smoothly under the guidance of the gears 332a and the rack grooves 315a, thereby reducing the shake of the camera module 34a and improving the life of the camera module 34q.

Figure 12:
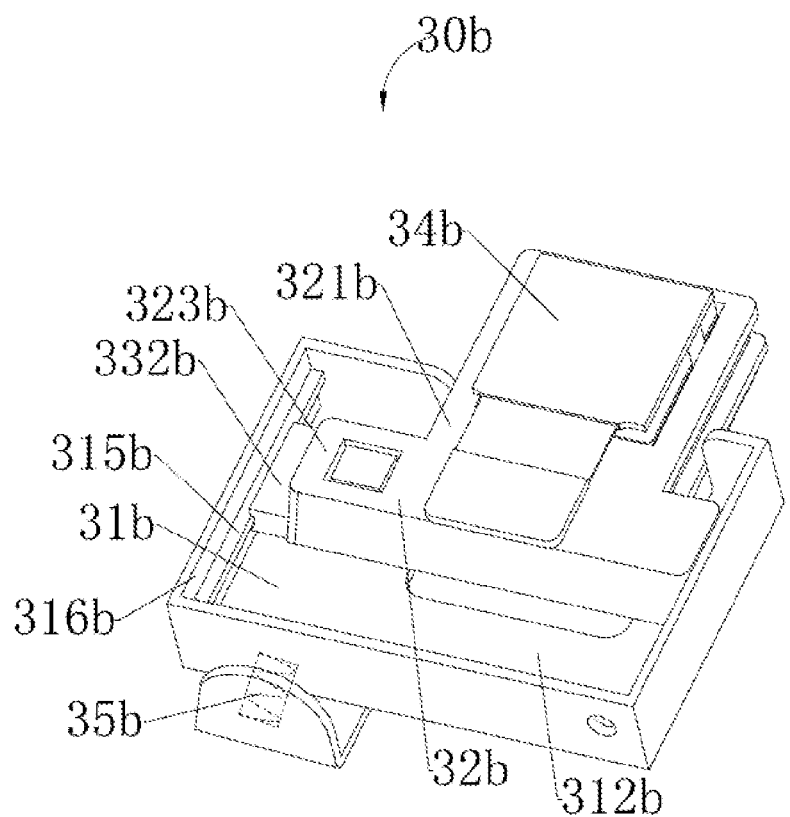
FIG. 12 is a schematic view of a camera assembly according to yet another embodiment of the present disclosure.

Referring to FIG. 12, a schematic view of a camera assembly according to yet another embodiment of the present disclosure is depicted.

The camera assembly 30b of the present embodiment may be different from the camera assembly 30 and the camera assembly 30a of the above mentioned in that the guiding device 33b may include a sliding block 332b and a guiding rail 315b. The sliding block 332b may be disposed on the mating portion 323b of the bracket 321b, the guiding rail 315b may be arranged on the fixed holder 31b. The sliding block 332b may match with the guiding rail 315b. The sliding block 332b may slide along the guiding rail 315b, so as to increase the sliding stability of the bracket 321b. Because the surface of the sliding block 332b in a sliding direction of the sliding block 332b may contact with the guiding rail 315b, and the sliding block 332b and the guiding rail 315b are in a snap-fit structure, the guiding rail 315b can give a stable support to the whole of the sliding block 332b, such that the sliding block 332b can slide smoothly on the guiding rail 315b, and the support device 32b can smoothly slide under the cooperation of the sliding block 332b and the guiding rail 315b, thereby reducing the shake of the camera module 34b, improving the life and shooting quality of the camera module 34b.

Specifically, the quantity of the sliding blocks 332b may be at least two, the sliding blocks 332b may be arranged at opposite ends of the bracket 321b, the quantity of the sliding blocks 332b may be two, three, or four, which is not limited herein. In this embodiment, the quantity of the sliding blocks 332b is two, and the sliding stability of the bracket 321b is further improved without occupying too much space.

The guiding rail 315b may be disposed on the base portion 312b of the fixed holder 31b and integrally formed with the fixed holder 31b. The advantage of the arrangement is that the opening direction of the guiding rail 315b could be the same as the opening and closing direction of the mold for manufacturing the fixed holder 31b, such that the normality depanning of the fixed holder 31a may be not affected, which in turn reduces the production cost of the mold for producing the fixed holder 31b.

The guiding rail 315b may also be disposed on the guiding wall 316b of the fixed holder 31b and integrally formed with the fixed holder 31b. The guiding wall 316b may be disposed at opposite ends of the base portion 312b along a direction of substantially perpendicular to the sliding direction of support device 32b, such that the guiding rail 315b and the sliding block 332b can be disposed in the width direction of the camera assembly 30b. Therefore, the thickness of the camera assembly 30b may be reduced, and the thickness of the mobile terminal can be made smaller.

The guiding rail 315b may also be mounted on a separate component to the guiding wall 316b or the base portion 312b of the fixed holder 31b.

Figure 13:
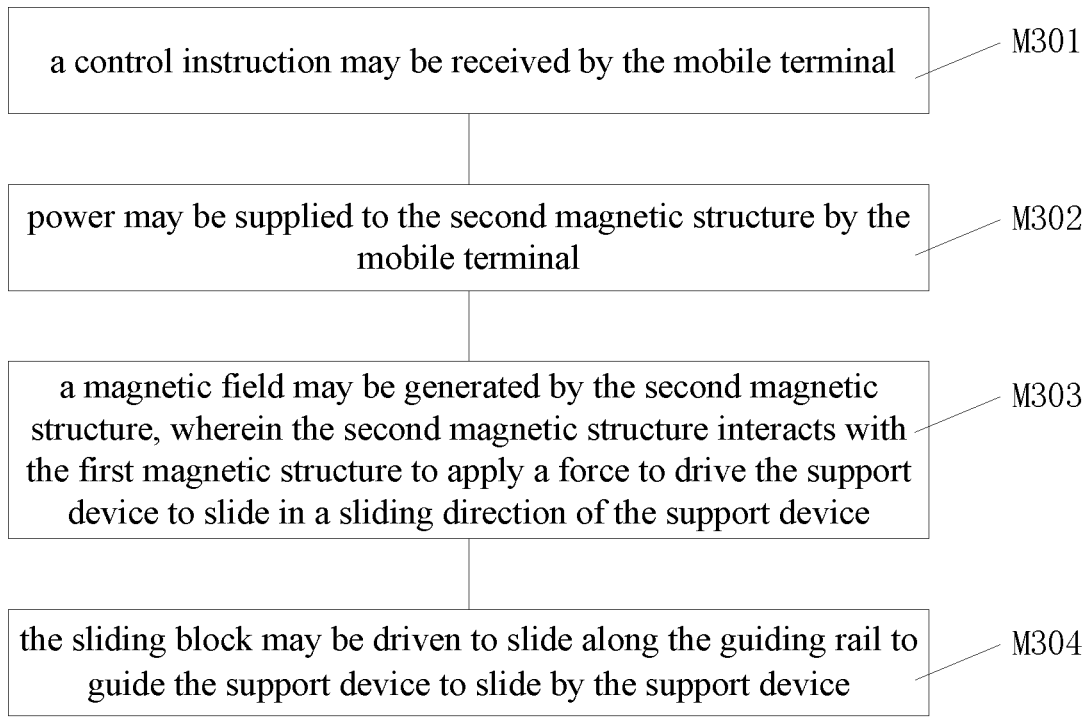
FIG. 13 is a flow chart diagram of a control method of a camera assembly of a mobile terminal according to yet another embodiment of the present disclosure.

Referring to FIG. 13, a flow chart diagram of a control method of a camera assembly of a mobile terminal according to yet another embodiment of the present disclosure is depicted. The camera assembly 30b may include a fixed holder 31b, a support device 32b, a sliding block 332b, a rail 315b, a camera module 34b and a second magnetic structure. The support device 32b may have a first magnetic structure, and the sliding block 332b may be disposed on the support device 32b. The guiding rail 315b is disposed on the fixed holder 31b, and the camera module 34b is disposed on the support device 32b.

M301: a control instruction may be received by the mobile terminal.

The control instructions received by the mobile terminal include instructions for starting a photographing, ending a photographing, starting a video chat, ending a video chat, starting a recording, and ending a recording, etc., which require a camera to cooperate the control instruction.

M302: power may be supplied to the second magnetic structure by the mobile terminal.

When the control instruction is an instruction to start the camera operation, the mobile terminal may supply a forward current to the second magnetic structure. When the control instruction is an instruction to end the camera operation, the mobile terminal may supply a reverse current to the second magnetic structure. The forward current may refer to an electric current that causes the second magnetic structure to generate a magnetic field contrary to the magnetic field generated by the first magnetic structure of the support device 32b such that the second magnetic structure can give the support device 32b a force away from the second magnetic structure. The reverse current may refer to an electric current that causes the second magnetic structure to generate the same magnetic field as the magnetic field generated by the first magnetic structure of the support device 32b such that the second magnetic structure can give the support device 32b a force close to the second magnetic structure. In addition, the magnitude of the electric current can control the strength of the magnetic field of the second magnetic structure, thereby controlling the force that the second magnetic structure supplies to the support device 32b.control instruction M303: a magnetic field may be generated by the second magnetic structure, wherein the second magnetic structure interacts with the first magnetic structure to apply a force to drive the support device to slide in a sliding direction of the support device.

The second magnetic structure may generate a corresponding magnetic field according to the direction and the magnitude of the electric current, and the magnetic field generated by the second magnetic structure may interact with the magnetic field generated by the first magnetic structure of the support device 32b to apply a driving force or a retracting force for the support device 32b to slide in the sliding direction of the support device 32b. The driving force can drive the support device 32b to move away from the second magnetic structure, and the support device 32b may drive the camera module 34b to extend from the inside of the mobile terminal. The retracting force can bring the support device 32b close to the second magnetic structure, and the support device 32b may drive the camera module 34b to retract inside the mobile terminal.

M304: the sliding block may be driven to slide along the guiding rail to guide the support device to slide by the support device.

The second magnetic structure may supply a driving force or a retracting force for the support device 32b, and the support device 32b may slide smoothly under the guidance of the sliding block 332a and the guiding rail 315b, thereby reducing the shake of the camera module 34b and improving the life of the camera module 34b.

Figure 14:
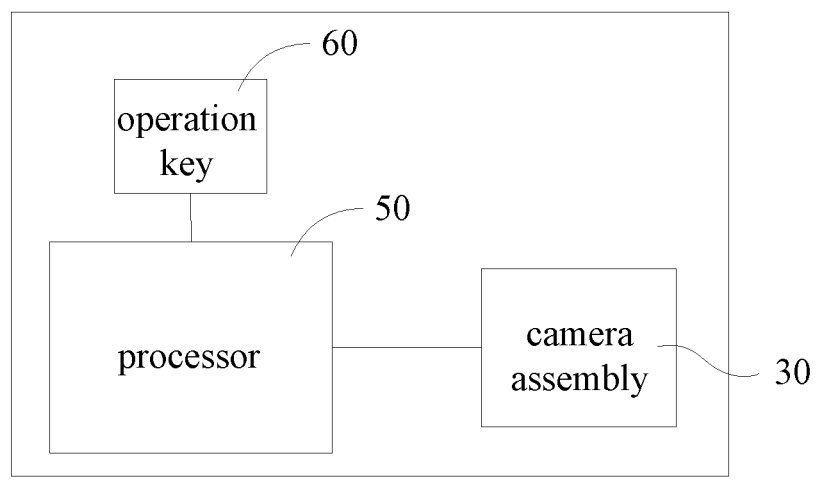
FIG. 14 is a block diagram showing a partial structure of the mobile terminal in FIG.

Referring to FIGS. 1, 5 and 14, electronic apparatus of embodiments may include processor 50. The processor 50 may be electrically connected to the camera assembly 30. Specifically, the processor 50 may be electrically connected to the second magnetic structure 35 of the camera assembly 30 to control the operation of the second magnetic structure 35. Of course, the processor 50 may also be electrically connected to the camera module 34 of the camera assembly 30 for controlling the camera module 34 to take pictures, which is within the understanding of those skilled in the art, and the details will not be described herein.

Alternatively, the processor 50 may be configured to receive a control instruction to further control the operation of the second magnetic structure 35. The control instruction may be generated by the display assembly 10 with a touch function after receiving the touch instruction. For example, a touch operation such as sliding, clicking, and long pressing on the display assembly 10. The specific form of the control operation can be set according to different types of mobile terminals and users' habits, such as drawing a C-shape and an L-shape, which are not specifically limited herein.

The electronic apparatus in this embodiment may further include an operation key 60, and the control instruction may be generated by the operation key 60 after receiving the touch-down instruction through the operation key 60. The operation key 60 may be a separate key, or may be shared with other function keys (power key, volume key, etc.) of the electronic apparatus, and is defined as different control instructions received by the processor 50 according to different key triggering methods, such that the second magnetic structure 35 is controlled to make different driving reactions. Of course, the operation key 60 may also be a non-physical key having a touch property.

In the above two embodiments above, for generating the control instruction, the touch-press instruction may include at least one of mobile payment, unlocking, taking a picture, video recording, file downloading, outbound calling, and video calling. The display assembly 10 with a touch function will be described as an example below.

Specifically, when a user operates a mobile terminal for mobile payment, unlocking, file downloading, or an outbound call, the user presses a corresponding function on the display assembly 10, and at this time, the processor 50 receives a control instruction to control the second magnetic structure 35 has an effect on the support device 32, so that the camera module 34 slides out of the mobile terminal under the guidance of the roller 332. The camera module 34 performs face recognition. After the recognition is successful, the corresponding operation is completed. Similarly, the gear guide structure and slider guide structure mentioned in the above embodiments can also replace the rollers 332 of this embodiment to form a new embodiment, the details will not be described herein.

When the user operates the mobile terminal to take a picture, record a video, or make a video call, the user touches the corresponding function on the display assembly 10. At this time, the processor 50 receives a control instruction, and then controls the second magnetic structure 35 to have an effect on the support device 32, so as to make the camera module 34 slide out from the mobile terminal under the guidance of the roller 332, and therefore, the camera module 34 could acquire image information of the subject.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A camera assembly, comprising:
a fixed holder;
a support device comprising a first magnetic structure;
a guiding device connected to the fixed holder and the support device, wherein the support device is slidably connected to the fixed holder by the guiding device;
a camera module arranged on the support device; and
a second magnetic structure configured to generate a magnetic field, wherein the second magnetic structure interacts with the first magnetic structure to apply a force to drive the support device to slide in a sliding direction of the support device relative to the fixed holder under the guidance of the guiding device, and the camera module is driven to move out of or in the fixed holder.

2. The camera assembly according to claim 1, wherein the support device comprises a bracket defining a first groove, and a first through hole is defined in a bottom wall of the first groove; the camera module is accommodated in the first groove; an axis of the camera module is coincided with the axis of the first through hole; the fixed holder comprises a base portion, and an axis of the first through hole is perpendicular to the base portion.

3. The camera assembly according to claim 2, wherein the bracket comprises a main body portion and a mating portion connected with the main body portion; the first groove is defined in the main body portion; and
the guiding device comprises a roller hinged with the mating portion, the fixed holder is provided with a guiding slot corresponding to the roller, and the roller rolls along the guiding slot.

4. The camera assembly according to claim 3, wherein the guiding slot is defined in the base portion; or
the number of the guiding slot is two; the fixed holder comprises two guiding walls disposed at opposite ends of the base portion perpendicular to the sliding direction of the support device; each of the guiding slots are defined in a corresponding guiding wall;
the number of the roller is two; the two rollers are arranged on opposite sides of the mating portion perpendicular to the sliding direction of the support device; each of the rollers is arranged on a corresponding side of the mating portion.

5. The camera assembly according to claim 2, wherein the first magnetic structure is a magnetic block; the bracket defines a second through hole, and the magnetic block is accommodated in the second through hole; and the second magnetic structure is an electromagnet, and the electromagnet interacts with the magnetic block.

6. The camera assembly according to claim 2, wherein the first magnetic structure is a magnetic block; the bracket defines a second groove, and the magnetic block is accommodated in the second groove; and the second magnetic structure is an electromagnet, and the electromagnet interacts with the magnetic block.

7. The camera assembly according to claim 2, wherein the base portion of the fixed holder is provided with limiting stop walls at opposite ends of the support device in the sliding direction, and a first opening for the bracket to slide out is defined in one of the limiting stop walls away from the second magnetic structure which is configured to restrict the entire bracket from sliding out from the first opening.

8. The camera assembly according to claim 7, wherein the base portion of the fixed holder is provided with a second opening corresponding to the sliding position of the bracket, the first opening and the second opening communicate with each other, and the bracket protrudes from the second opening to reduce thickness of the camera assembly in an axial direction of camera module.

9. The camera assembly according to claim 1, wherein the camera module is kept at a state of out of the fixed holder by a repulsive force between the first magnetic structure and the second magnetic structure, or kept at a state of in the fixed holder by an attractive force between the first magnetic structure and the second magnetic structure.

10. An electronic apparatus, comprising:
a display assembly configured to display information;
a housing assembly, wherein the display assembly is mounted on the housing assembly; and
a camera assembly arranged in the housing assembly, wherein at least a part of the camera assembly is stacked with a display area of the display assembly in a non-extended state; the camera assembly comprises:
a support device comprising a first magnetic structure, a guiding device, a camera module and a second magnetic structure, the support device is slidably connected to the housing assembly through the guiding device; the camera module is arranged on the support device; and the second magnetic structure interacts with the first magnetic structure to apply a force to drive the support device to slide under the guidance of the guiding device, and the camera module is driven to extend out of or retract in the housing assembly.

11. The electronic apparatus according to claim 10, wherein the camera assembly further comprises a fixed holder connected to the housing assembly; and the support device is slidably connected to the fixed holder by the guiding device.

12. The electronic apparatus according to claim 11, wherein the support device comprises a bracket defining a first groove, and a first through hole is defined by a bottom wall of the first groove, the camera module is accommodated in the first groove, an axis of the camera module is coincided with an axis of the first through hole; and the fixed holder comprises a base portion, the axis of the first through hole is perpendicular to the base portion.

13. The electronic apparatus according to claim 12, wherein the bracket comprises a main body portion and a mating portion connected with the main body portion; the first groove is defined in the main body portion; and
the guiding device comprises a roller hinged with the mating portion, the fixed holder is provided with a guiding slot corresponding to the roller, and the roller rolls along the guiding slot.

14. The electronic apparatus according to claim 13, wherein the guiding slot is defined in the base portion; or
the number of the guiding slot is two; the fixed holder comprises two guiding walls disposed at opposite ends of the base portion perpendicular to the sliding direction of the support device; each of the guiding slots are defined in a corresponding guiding wall;
the number of the roller is two; the two rollers are arranged on opposite sides of the mating portion perpendicular to the sliding direction of the support device; each of the rollers is arranged on a corresponding side of the mating portion.

15. The electronic apparatus according to claim 12, wherein the first magnetic structure is a magnetic block; the bracket defines a second through hole, and the magnetic block is accommodated in the second through hole; and the second magnetic structure is an electromagnet, and the electromagnet interacts with the magnetic block.

16. The electronic apparatus according to claim 12, wherein the base portion of the fixed holder is provided with limiting stop walls at opposite ends of the support device in the sliding direction, and a first opening for the bracket to slide out is defined in one of the limiting stop walls which is configured to restrict the entire bracket from sliding out of the first opening.

17. The electronic apparatus according to claim 10, wherein the housing assembly comprises a shell and a dust shield, the display assembly is mounted on the shell, the camera assembly is provided in the shell and capable of extending from an end of the shell to the outside of the shell, the end of the shell defines an opening hole through which the camera assembly slides out, the dust shield is accommodated in the opening hole and close the opening hole, and the dust shield is resiliently hinged to the shell; and the dust shield is pushed out of the opening hole by the camera assembly when the camera assembly is in an extended state, and the dust shield rebounds automatically to and accommodated in the opening hole when the camera assembly is in a non-extended state.

18. An electronic apparatus, comprising:
a processor; and
a camera assembly connected to the processor; wherein the camera assembly comprises a fixed holder, a support device comprising a first magnetic structure, a guiding device, a camera module and a second magnetic structure;
wherein the camera module is arranged on the support device; the support device is slidably connected to the fixed holder by the guiding device; and the processor is configured to receive a control instruction to control the second magnetic structure to generate a repulsive force or an attractive force between the first magnetic structure and the second magnetic structure to drive the support device to slide under the guidance of the guiding device relative to the fixed holder, such that camera module is driven to move between an extended state and a non-extended state.

19. The electronic apparatus according to claim 18, further comprising a display assembly, wherein the control instruction is generated by the display assembly after the display assembly receives a touch instruction of mobile payment, and the camera module slides out of the electronic apparatus under the controlling of the processor to perform face recognition.

20. The electronic apparatus according to claim 18, further comprising a display assembly, wherein the control instruction is generated by the display assembly after the display assembly receives a touch instruction of taking a picture, and the camera module slides out of the electronic apparatus under the controlling of the processor to acquire image information of a subject.

* * * * *